Nov. 24, 1959 C. L. SMALL 2,914,349
EQUALIZING BEAM END ASSEMBLY FOR A TANDEM WHEEL AND AXLE UNIT
Filed April 30, 1958
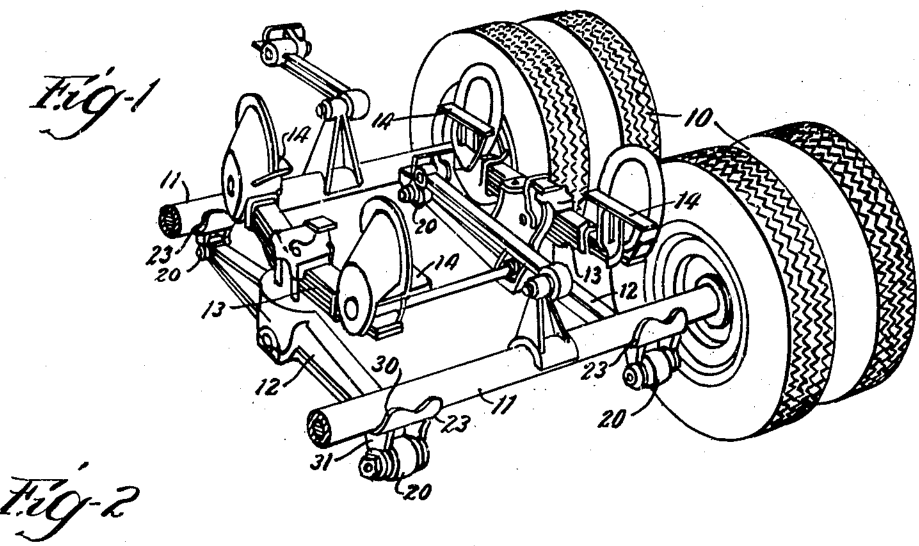
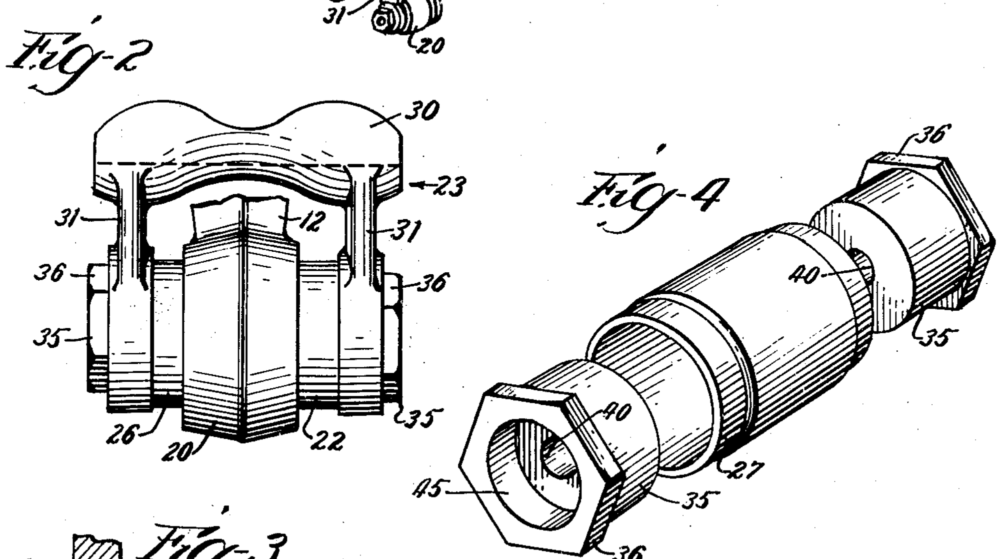
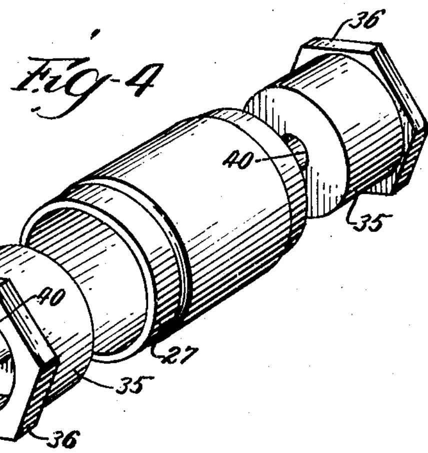
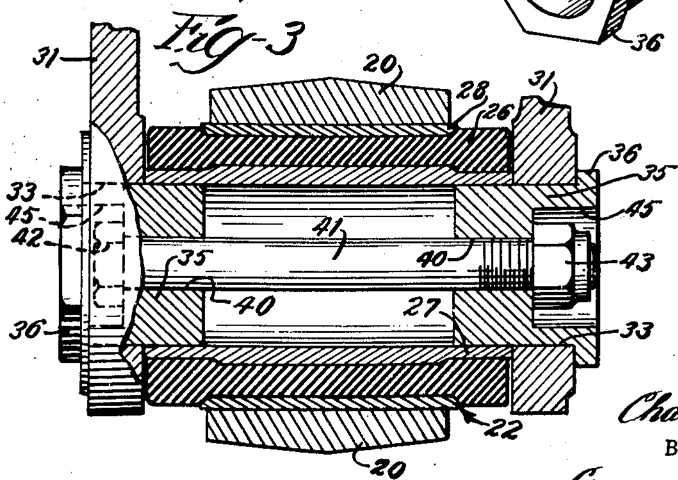
INVENTOR.
Charles L. Small
BY
Cromwell, Greist & Warden
Attys.

United States Patent Office 2,914,349

Patented Nov. 24, 1959

2,914,349

EQUALIZING BEAM END ASSEMBLY FOR A TANDEM WHEEL AND AXLE UNIT

Charles L. Small, Chicago, Ill., assignor to Hendrickson Mfg. Co., Lyons, Ill., a corporation of Illinois Application April 30, 1958, Serial No. 731,999

4 Claims. (Cl. 287—85)

This invention relates to an equalizing beam end assembly and particularly to means for supporting a cylindrical bushing, which is carried on the end of an equalizing beam, from an axle-hanger bracket of a tandem wheel-and-axle assembly for a truck or the like.

In the past it has been the practice in mounting an equalizing beam end bushing between spaced arms of an axle-hanger bracket to pass a tubular member through openings formed in the arms of the bracket and through the bore of the cylindrical bushing and to secure nut members upon externally threaded ends of the tubular member to retain it in supporting engagement with the bushing. It is necessary to periodically replace such bushings due to wear or breakage. An annoying problem is often encountered in attempting to remove the tubular member to replace the bushing inasmuch as the tubular member which is formed of metal tends to "freeze" in an inner metallic sleeve of the bushing due to the metal-to-metal contact therebetween which extends for the full length of the bushing.

It is therefore the general object of the invention to provide a new and improved equalizing beam end assembly which is easy to disassemble for repair or replacement.

Another object of the invention is to provide a new and improved equalizing beam end assembly wherein a pair of cylindrical plugs or adapters are passed through the openings in the spaced arms of the axle-hanger bracket and a short distance into the adjacent ends of the inner metallic sleeve of the bushing, and wherein a removable nut-and-bolt assembly is secured between the two plugs to retain them in supporting engagement with the bushing.

Another object of the invention is to provide a new and improved equalizing beam end assembly of the character described wherein the area of metal-to-metal contact between the inner metallic sleeve of the bushing and the cylindrical plugs is sufficient to provide full diameter support at the end of the bushing where the major twisting pressure is applied yet which area is relatively small to substantially reduce the tendency of "freezing" between the inner sleeve of the bushing and the cylindrical plugs.

It is a further object of the invention to provide such an assembly wherein the plugs are provided on their outer ends with wrench-engageable surfaces to facilitate loosening the plugs when it is desirable to remove them for replacement of the bushing and wherein it is a simple matter after one plug has been removed to drive the other plug out by inserting a member in the open end of the bushing.

It is a still further object of the invention to provide such an assembly wherein the outer ends of the two plugs are recessed to wholly receive the head and nut of the nut-and-bolt device whereby to protect the nut and bolt device against damage or mutilation.

Certain other objects of the invention will, in part, be obvious, and will in part appear hereinafter. For a more complete understanding of the nature and scope of the invention reference may now be had to the accompanying drawings wherein:

Fig. 1 is a fragmentary perspective view of a tandem wheel-and-axle assembly wherein the cylindrical bushings carried on the ends of the equalizing beams are mounted between the arms of the axle-hanger brackets in accordance with the invention;

Fig. 2 is an enlarged elevational view of a preferred form of the invention;

Fig. 3 is an enlarged vertical, longitudinal sectional view taken through the end assembly of Fig. 2 with the left end of the view shown partially in elevation; and Fig. 4 is an exploded perspective view of the inner sleeve of the bushing and the cylindrical plugs forming part of the end assembly.

In Fig. 1 there is shown a typical tandem wheel-and-axle assembly including two sets of dual wheels 10, front and rear axle housings 11, a pair of equalizing beams 12, and two sets of leaf spring units 13 having bracket means 14 at the ends thereof upon which the frame or body of a vehicle may be supported. Eyes are formed on the opposite ends 20 of each equalizing beam 12 for receiving a cylindrical bushing indicated generally at 22, the ends of which are supported between the depending sides or arms of an axle-hanger bracket 23.

Each bushing 22, as best shown in Figs. 3 and 4, comprises a cylindrical rubber sleeve 26, an inner metallic sleeve 27 which extends the full length of the rubber portion 26, and a relatively narrower outer metallic sleeve 28 which has a width slightly greater than the width of the end 20 of the equalizing beam 12. The metal sleeves are bonded to the rubber sleeve 26 in a known manner. Each axle-hanger bracket 23 comprises an upper concave cradle portion 30 which is secured, as by welding, to the underside of one of the axle housings 11, and a pair of depending arms 31 which are laterally spaced apart a distance approximately equal to the length of the bushing 22. The arms 31 are provided with horizontally aligned bores 33 having a diameter substantially equal to the inner diameter of the inner sleeve member 27 of the bushing.

In order to pivotably mount or support the bushing 22 between the arms 31 of the axle-hanger bracket 23, a pair of cylindrical plug members or adapters 35 are provided. The major portion of each plug member 35 has an outer diameter substantially equal to the diameter of the bores 33 formed in the arms 31 so that the plug members 35 may be inserted through the bores 33 and into the adjacent ends of the inner sleeve 27 of the bushing as shown in Fig. 3.

The outer end portion 36 of each plug member 35 is in the form of a flange so as to abut against the outer surface of the arm 31 and limit the distance the plug may be inserted in the bushing 22. The flange portions 36 are relatively narrow. As is evident in Fig. 3, the length of each plug 35 is such that it extends an appreciable but relatively short distance into the adjacent end of the bushing sleeve 27, the distance being substantially less than one quarter of the length of the bushing. This arrangement provides full support at the ends of the bushing 22 where the major twisting pressure is applied upon relative twisting between the equalizing beam 12 and the axle-hanger bracket 23 in the range of approximately ten degrees, while minimizing the area of metal-to-metal contact between the inner sleeve 27 of the bushing and the plugs 35 to substantially reduce the area of possible "freezing" therebetween during a long period of use.

To retain the plugs 35 in their bushing-supporting positions, an axial bore 40 is formed in each plug and an elongated bolt 41 is passed through the bores 40 so that its head 42 is in engagement with the recessed end of one plug. A nut 43 is then threaded onto the end of the bolt and tightened into engagement with the recessed end of the other plug.

Preferably a recess or counterbore 45 is formed in the outer end of each plug so that the nut 43 and the head 42 of the bolt 41 are wholly disposed within the recesses 45. This feature of substantially enclosing the head and nut of the bolt prevents projection of these parts beyond the ends of the plugs and also tends to protect them from damage, such as mutilation of the threads by stones or other objects thrown up by the wheels 10.

The flanged end portions 36 of the plugs 35 are provided with wrench-engageable or nut surfaces to facilitate loosening of the plugs and their removal from the inner sleeve 27 of the bushing. After one plug has been removed, it is a simple matter to drive the other plug out should it be stuck by inserting an elongated member into the open end of the bushing 22.

If necessary, portions of the flanged ends 36 of the plugs 35 may be cut away to provide clearance for other parts of the wheel-and-axle assembly.

In initial assembly, the bushing 22 carried on the end 20 of the equalizing beam 12 is positioned between the arms 31 of the axle-hanger bracket 23 after which the plugs or bushing adapters 35 are inserted through the openings in the arms 31 and into the ends of the inner sleeve 27 of the bushing. The bolt 41 is then inserted through the bores 40 in the plugs 35 and the nut 43 tightened thereon to secure or retain the plugs in their bushing-supporting positions.

When a bushing 22 requires replacement as a result of wear or breakage, generally, after a long period of use, this is readily accomplished by first removing the nut 43 from the bolt 41, removing the bolt from the bores 40, and then removing the plugs 35. Although some "freezing" of the plugs in the sleeve 27 may have occurred due to the metal-to-metal contact therebetween, such area of "freezing" is at a minimum with this construction. Should such "freezing" have occurred, the plugs 35 may be easily loosened by the use of a conventional wrench on the flanged, wrench-engageable end portion 36 of each plug. After one plug has been removed, an elongated member may easily be inserted in the open end of the bushing 22 to drive out the remaining plug.

It will be understood that certain minor changes may be made in the construction or arrangement of the equalizing beam end assembly disclosed herein without departing from the spirit and scope of the invention as defined in the appended claims.

I claim:

1. In combination with a cylindrical bushing mounted on the end of an equalizing beam and an axle-hanger bracket having a pair of arms spaced apart sufficiently to receive the bushing longitudinally therebetween and with the arms having aligned holes formed therein of a size substantially equal to the bore of the cylindrical bushing, a pair of removable, cylindrical plugs inserted through the arm openings and into opposite ends of the bushing to pivotally support the bushing between the arms of the axle-hanger bracket, means limiting the distance said plugs are inserted into the ends of the bushing to minimize the area of contact therebetween while permitting adequate supporting contact therebetween, and a releasable fastener means engageable with the outer ends of both plugs and extending therebetween to hold said plugs in bushing-supporting engagement in the ends of the bushing.

2. In a tandem-axle assembly having a cylindrical rubber bushing with an inner metallic sleeve mounted in the end of an equalizing beam and adapted to fit longitudinally between a pair of bored arms of an axle-hanger bracket, the improvement which comprises, a pair of removable, metallic plugs extending through the bored arms and into opposite ends of the metallic sleeve for supporting the bushing between the arms of the axle-hanger bracket, each of said plugs having a central bore extending therethrough which bore is counterbored at the outer end; a releasable fastener extending through said bores and between said plugs with the ends of the fastener being disposed wholly within said counterbores, said fastener normally insuring supporting engagement of said plugs within the ends of the bushing sleeve, said plugs being adapted to extend only far enough into the ends of the bushing sleeve to properly support the bushing so as to minimize the area of contact between the metallic plugs and the metallic sleeve and thus the tendency of "freezing" therebetween, and wrench-engageable means at the outer end of each plug to facilitate removal of the plugs when said fastener is released to permit replacement of worn out bushings.

3. In combination with a cylindrical bushing mounted on the end of an equalizing beam and an axle-hanger bracket having a pair of arms spaced apart sufficiently to receive the bushing longitudinally therebetween and with the arms having aligned holes formed therein, a pair of plugs extending through the arm openings and into opposite ends of the bushing to support the bushing between the arms of the axle-hanger bracket, each of said plugs extending into the bore of the bushing a distance substantially less than one quarter the length thereof to properly support the bushing while minimizing the area of contact therebetween, and nut-and-bolt means extending between said plugs to retain them in their bushing-supporting positions.

4. In an equalizing beam assembly for tandem truck axles wherein a cylindrical rubber bushing having inner and outer metal sleeves is secured to the end of the equalizing beam, means for connecting the bushing to an axle-hanger bracket having a pair of bored arms spaced apart a distance equal to the length of the bushing comprising, a pair of cylindrical plugs having a flanged, wrench-engageable portion at one end thereof, each of said plugs extending through one of said bored arms and into the adjacent end of the inner sleeve of the bushing disposed between the two arms of the axle-hanger bracket, the wrench-engageable portions of said plugs abutting against the outer surfaces of the arms so that each of said plugs extends a distance into the end of the inner sleeve substantially less than one quarter the length thereof, means defining aligned, axial bores in said two plugs, a bolt-and-nut assembly extending through said axially aligned bores for retaining said plugs in their bushing-supporting positions, and means defining a recess in the outer surface of each plug whereby the nut and the head of the bolt of said bolt-and-nut assembly are disposed wholly within said recesses.

References Cited in the file of this patent

UNITED STATES PATENTS

| | | |
|---|---|---|
| 1,750,346 | Chilton | Mar. 11, 1930 |
| 1,750,607 | Short | Mar. 11, 1930 |
| 2,346,574 | Guy | Apr. 11, 1944 |
| 2,414,743 | Kaemmerling | Jan. 21, 1947 |
| 2,484,191 | Soldan | Oct. 11, 1949 |
| 2,749,160 | Cowles | June 5, 1956 |

FOREIGN PATENTS

| | | |
|---|---|---|
| 774,062 | France | Sept. 17, 1934 |